United States Patent [19]

Bortnick et al.

[11] Patent Number: 5,508,322
[45] Date of Patent: Apr. 16, 1996

[54] MELT-PROCESSED POLYMER BLENDS

[76] Inventors: Newman M. Bortnick, 509 Oreland Mill Rd., Oreland, Pa. 19075; Roger K. Graham, 716 Iron Post Rd., Moorestown, N.J. 08057; Edward E. LaFleur, 1190 Creekwood Dr., Warminster, Pa. 18974; William J. Work, 1288 Burnett Rd., Huntingdon Valley, Pa. 19006; Jiun-Chen Wu, 3 Oakwood Way, Robbinsville, N.J. 08691

[21] Appl. No.: 369,200

[22] Filed: Jan. 5, 1995

Related U.S. Application Data

[62] Division of Ser. No. 241,550, May 12, 1994, Pat. No. 5,403,875.

[51] Int. Cl.$^6$ .................................................. C08L 3/02
[52] U.S. Cl. .................... 523/201; 524/47; 524/52; 524/53; 525/902
[58] Field of Search ......................... 523/201; 524/47, 524/52, 53; 525/902

[56] References Cited

U.S. PATENT DOCUMENTS

| | | | |
|---|---|---|---|
| 3,671,472 | 6/1972 | McNamee et al. | 524/52 |
| 5,095,054 | 5/1992 | Lay et al. | 524/47 |
| 5,131,953 | 7/1992 | Kasica et al. | 127/65 |
| 5,188,674 | 2/1993 | Kasica et al. | 127/65 |
| 5,189,097 | 2/1993 | LaFleur et al. | 525/57 |
| 5,258,230 | 11/1993 | LaFleur et al. | 428/516 |
| 5,314,934 | 5/1994 | Tumka | 524/53 |
| 5,316,578 | 3/1994 | Buehler et al. | 106/210 |
| 5,362,777 | 11/1994 | Tomka | 524/47 |
| 5,362,778 | 11/1994 | Famili et al. | 524/50 |
| 5,389,724 | 2/1995 | LaFleur | 525/57 |

FOREIGN PATENT DOCUMENTS

| | | |
|---|---|---|
| 583109A1 | 7/1993 | European Pat. Off. . |
| 583109 | 7/1993 | European Pat. Off. . |

OTHER PUBLICATIONS

Starch-Based Blown Films; F. H. Otey, R. P. Westhoff and W. M. Doane, pp. 592–595, Ind. Eng. Chem. Prod. Res. Dev.—1980.

Starch-Based Blown Films.2; F. H. Otey, R. P. Westhoff and W. M. Doane, p. 1659, Ind. Eng. Chem. Prod. Res. Dev.—1987.

Effects of Water Content on the Properties of Starch/Poly-(ethylene–vinyl alcohol) Blends; P. A. Dell and W. G. Kohlman, pp. 353–363, Journal of Applied Polymer Science, vol. 52 (1994).

Thermoplastic Starch Blends With a Poly(Ethylene-Co-Vinyl Alcohol): Processability and Physical Properties; E. R. George, T. M. Sullivan, E. H. Park, Polymer Eng. and Science, Mid-Jan. 1994, vol. 34, No. 1, pp. 17–23.

*Primary Examiner*—Peter A. Szekely
*Attorney, Agent, or Firm*—Roger K. Graham

[57] ABSTRACT

Blends of starch with acrylic polymers containing at least one of copolymerized acid or amide groups may be melt-processed into useful thermoplastic articles.

2 Claims, No Drawings

MELT-PROCESSED POLYMER BLENDS

This is a divisional application Ser. No. 08/241,550, filed May 12, 1994, now U.S. Pat. No. 5,403,875.

FIELD OF THE INVENTION

This invention relates to an improved method for processing starch as a thermoplastic by combining it with acrylic copolymers (i.e., copolymers containing units derived from one of more alkyl, cycloalkyl, hydroxyalkyl(polyalkoxy)alkyl, or alkyloxy(polyalkoxy)alkyl esters of acrylic or methacrylic acid, and further containing at least one of a copolymerizable acid monomer or a copolymerizable monomer containing an amide or cyclic amide group.) The melt-processed blends are useful in producing thermoplastic articles which are biodegradable, such as sheet, film, and injection-molded objects.

BACKGROUND OF THE INVENTION

Starch is an inexpensive, biodegradable, renewable polymer which has potential in many thermoplastic applications if means can be found to convert it into a melt-processable material. It is known that the starch granules can be thermally destructured or gelatinized by the effect of shear, heat and water to produce a thermoplastic material, which may further be plasticized with glycerine. The resulting material, perhaps because its molecular weight has been drastically lowered, is rather brittle, contains varying amounts of water which effects both the initial and the equilibrium properties, and the plasticizer may exude.

George et al., Poly. Eng. Sci., 34, 17–23 (1994) have described utilization of high levels of ethylene-vinyl alcohol copolymers in combination with starch to yield a more injection-moldable and more ductile blend. Lay et al., U.S. Pat. No. 5,095,054 describe many polymers useful in modifying starch; among theses are ethylene/acrylic acid copolymers, but such polymers must be neutralized to be effective. Further, Lay et al. teach that acid-containing polymers can have no other functionalized copolymers, including (meth-)acrylic esters; thus, they specifically exclude the additive polymers of the present invention. They do teach polymers of vinyl pyrrolidone, but not in combination with (meth-)acrylic esters and unsaturated acids. LaFleur et al., U.S. Pat. No. 5,189,097 and 5,258,250 have shown that (meth)acrylic copolymers containing at least one of a vinyl amide or a carboxylic acid are useful in making poly(vinyl alcohol) melt-processable. A recent filing by some of the present inventors (European Unexamined Publication 583,109) discloses modification of starch into a thermoplastic material by utilizing the combination of poly(vinyl alcohol) and the (meth)acrylic copolymers of LaFleur et al.

None of the above approaches are totally satisfactory in converting starch to a thermoplastic material; they either require a combination of additives, often requiring a plasticizer, or they require high amounts of the additive polymer(s), or the starch still requires excessive processing with resulting degradation of molecular weight to make the starch thermoplastic.

SUMMARY OF THE INVENTION

We have found that the (meth)acrylic copolymers described by LaFleur et al. may be used at relatively low levels to process starch into a useful thermoplastic material. Further we have found that the (meth)acrylic copolymers, which are readily prepared in emulsion form, need not be isolated, but may be blended directly with the starch either prior to extrusion (melt-processing) or, preferably, in the extruder, so that admixture, gelatinization, devolatilization of water, and processing into pellets, sheet, or film, may be accomplished in one simple operation. We have further found that the starch may be processed into a useful thermoplastic material without destructurizing or gelatinizing the starch.

DETAILED DESCRIPTION OF THE INVENTION

Thus, we have discovered a melt-processed blend comprising 70 to 95 parts of starch, such as corn starch, or amylopectin or amylose, or mixtures thereof, and 5 to 30 parts of a second polymer containing at least about 70 parts of units derived from at least one of art alkyl, cycloalkyl, hydroxyalkyl(polyalkoxy)alkyl, or alkyloxy(polyalkoxy)alkyl ester of acrylic or methacrylic acid, and at least one of either up to 25 parts of units derived from a vinyl or vinylidene monomer containing an amide group or up to 25 parts of units derived from art unsaturated carboxylic acid or anhydride wherein the second polymer has a weight-average molecular weight of at least 80,000, and preferably of at least 300,000. The invention further relates to film, sheet, or injection molded objects prepared from the melt-processed blend described above.

Starch is used herein to describe the naturally occurring polymer of D-glucose stored in granules, wherein it is ordered in crystalline and amorphous regions, as a food source in many plants, such as corn, wheat, rice, potatoes, tapioca, and peas. Starches in their natural form consist of linear molecules (amylose) and branched molecules (amylopectin). Native corn starch is about 75% amylopectin, whilst waxy maize is essentially all amylopectin. Starches are commercially available also in somewhat purified form, resulting from pre-gelatinizing techniques or "cooking" for some period to de-structure the starch.

Unlike the melt processable starch described in the literature, the melt-processed blends of the present invention do not require destructurization or gelatinization of the starch during or before processing. The starch maintains its structure and is not degraded in molecular weight or structure. This behavior is quite unexpected, based on what is known to the art.

This melt-processed blend may further contain at least one of a lubricant, such as stearic acid, or a thermal stabilizer, such as a hindered phenol, such as tetrakis(methylene(3,5-di-t-butyl-4-hydroxyhydrocinnamate)methane and related compounds. The lubricants are present to assure good transport through the extrusion and molding process, and may not be required for many operations. The hindered phenol anti-oxidant may be present to prevent thermal/oxidative breakdown of either the starch or acrylic additive, and may not be required if careful control at lower temperatures and with exclusion of oxygen is practiced during the blending and molding or extrusion operations.

The second polymer preferably contains units derived front methyl methacrylate and also units derived front a lower alkyl acrylate of from 1 to 4 carbon atoms, such as methyl acrylate, ethyl acrylate, butyl acrylate, and the like. It may also contain units derived front the monoacrylate or monomethacrylate ester of a hydroxyalkyloxy(polyalkoxy)alkyl or polyalkylene glycol monoalkyl ether, such as the methacrylate ester of ω-methoxypolyethyleneoxyethanol or ω-hydroxypolyethyleneoxyethanol. If the second polymer contains units derived from a vinyl or vinylidene monomer containing an amide group, preferred are units derived from N-vinylpyrrolidone, in the range of from 10 to 25 parts. It is preferred that the second polymer contain units derived from an unsaturated carboxylic acid or anhydride, more preferred from 2 to 5 parts of units derived from an unsaturated carboxylic acid or anhydride, and most preferred units derived from acrylic acid or methacrylic acid. The term "unsaturated carboxylic acid or anhydride" embraces unsaturated polycarboxylic acids also, such as itaconic acid, maleic acid, and the like.

The second polymer has a weight-average molecular weight of at least of at least 80,000, and preferably 300,000, because the starch, being of low melt strength, does not mix well with additive polymers of lower molecular weight, such mixtures not having the desired melt viscosity to ensure good mixing. Best mixing occurs when the molecular weight is 300,000 and above.

We have further discovered an improved process for preparing a melt-processed blend comprising 70 to 95 parts of starch and 5 to 30 parts of a second polymer containing at least about 70 parts of units derived from at least one of an alkyl, cycloalkyl, or alkyloxy(polyalkoxy)alkyl ester of acrylic or methacrylic acid, and at least one of either up to 25 parts of units derived from a vinyl or vinylidene monomer containing an amide group or up to 25 parts of units derived from an unsaturated carboxylic acid or anhydride wherein the second polymer has a weight-average molecular weight of at least 80,000, and preferably at least 300,000, comprising:

a) preparing the second polymer as an aqueous dispersion by emulsion polymerization, the dispersion being between 20 and 60 percent solids;

b) adding the emulsion polymer with heat and agitation to the starch to obtain a uniform mixture;

c) conveying the mixture to a devolatilization extruder equipped with means for devolatilization of the extruder contents and means for heating the blend;

d) conveying the mixture through the extruder whilst removing water through the means for devolatilization and whilst supplying heat to the mixture;

e) converting said mixture to a thermoplastic melt essentially free from water;

f) conveying said melt to the exit of the extruder;

g) forming said melt into film, sheet, or re-moldable pellets.

We have further discovered an improved process for preparing a melt-processed blend comprising 70 to 95 parts of starch and 5 to 30 parts of a second polymer containing at least about 70 parts of units derived from at least one of an alkyl, cycloalkyl, or alkyloxy(polyalkoxy)alkyl ester of acrylic or methacrylic acid, and at least one of either up to 25 parts of units derived from a vinyl or vinylidene monomer containing an amide group or up to 25 parts of units derived from an unsaturated carboxylic acid or anhydride, wherein the second polymer has a weight-average molecular weight of at least of at least 80,000, and preferably 300,000, comprising:

a) preparing the second polymer as an aqueous dispersion by emulsion polymerization, the dispersion being between 20 and 60 percent solids;

b) conveying the aqueous dispersion and the starch with mixing to a devolatilization extruder equipped with means for devolatilization of the extruder contents and means for mixing and heating the blend;

c) mixing and heating the two polymers within the extruder until a uniform mixture is formed, that is, fusion to a melt which appears uniform in appearance occurs;

d) further conveying the mixture through the extruder whilst removing water through the means for devolatilization and whilst supplying heat to the mixture;

e) converting said mixture to a thermoplastic melt essentially free from water;

f) conveying said melt to the exit of the extruder;

g) forming said melt into film, sheet, or re-moldable pellets.

In both of these processes, the preparation of the second polymer in emulsion may be accomplished as taught in the LaFleur references. To achieve the molecular weight of 300,000 or above, it is preferred to lower the content of any chain transfer agent, such a mercaptan, in the formulation. Since emulsion-prepared acrylic polymers are generally of molecular weight above 300,000 unless special care is taken to lower the molecular weight, the achievement of a value equal or greater than 300,000 is well within the purvey of one of ordinary skill in the art.

If additional water is required to fully process the blend, such may be added either during the pre-extrusion mixing or during the extrusion process, and fed to an appropriate entrance port in the extruder. The devolatilization extruder may be any of the conventional types of single- or twin-screw extruders known to the art. Normally the water will be removed through vents at atmospheric pressure or, preferably, under vacuum. There is enough water dissolved into the starch/acrylic polymer mixture that techniques known to remove the water as a liquid from water-insoluble polymers are less satisfactory here, but if water does separate as a separate phase, appropriate equipment, such as described in Bortnick, U.S. Pat. No. 3,751,527 may be employed.

It is also possible to mix the starch and the acrylic polymer in dry form directly in an intensive mixer or an extruder to form a fused melt, followed by conventional processing in the extruder.

The melt-processed blend may be taken from the extruder as a film or sheet and used directly, or it may be taken as strands, cut into pellets, and the pellets re-processed by conventional injection-molding or extrusion techniques into useful objects.

Articles which may be formed from the melt-processed blend include transparent sheet for packaging, such as food packaging, transparent film for co-extrusion or laminating with water-insensitive support films, or injection-molded articles for disposable uses, such as cups, trays, containers, and the like.

When an attempt is made to separate the acrylic polymer, generally soluble in tetrahydrofuran from the starch, generally insoluble in tetrahydrofuran, not all the acrylic polymer can be removed. This is an indication that within the melt-processed blend is a segmented polymer (either a block or a graft copolymer) comprising 70 to 95 parts of one or more segments of starch chemically joined to 5 to 30 parts of one or more segments of a second polymer containing at least about 70 parts of units derived from at least one of an alkyl, cycloalkyl, hydroxyalkyl(polyalkyloxy)alkyl,, or alkyloxy(polyalkoxy)alkyl ester of acrylic or methacrylic acid, and at least one of either up to 25 parts of units derived from a vinyl or vinylidene monomer containing an amide group or up to 25 parts of units derived from an unsaturated carboxylic acid or anhydride, wherein the segments of the second polymer have a weight-average molecular weight of each segment of at least 80,000, and preferably of at least 300,000, and wherein some of the copolymerized units derived from an unsaturated acid or anhydride have reacted with the starch.

It is possible to use the acid or anhydride containing polymer in the form of a multi-stage or core/shell polymer. Such polymers are well-known as impact modifiers for a variety of matrix polar plastics, especially when the matrix polymer contains groups to bond with the acid or anhydride. Thus polymers such as taught by Owens et al., U.S. Pat. No. 3,668,247, are useful in thermoprocessable blends of the present invention.

More specifically, the invention encompasses a melt-processed polymeric blend comprising from about 70 to about 95 parts of starch and 5 to 30 parts of a second, multi-stage polymer comprising:

1. a rubbery cross-linked core (first-stage) polymer which contains greater than 75 weight percent, based on total weight of the core, of butadiene and/or one or more $C_2$–$C_8$ alkyl esters of acrylic acid, optionally with up to about 5 weight percent of a copolymerized unsaturated acid;
2. a second-stage polymer containing at least about 70 parts of units derived from at least one of an alkyl, cycloalkyl, hydroxyalkyl(polyalkoxy)alkyl, or alkyloxy(polyalkoxy)alkyl ester of acrylic or methacrylic acid, and at least one of either up to 25 parts of units derived from a vinyl or vinylidene monomer containing an amide group or up to 25 parts of units derived from an unsaturated carboxylic acid or anhydride. Preferred are such compositions wherein the core polymer is at least 60% by weight of the core/shell polymer.

Such polymers are not necessarily core/shell polymers, as the second stage may be as domains included in the first stage, similar in morphology to polymers described in U.S. Pat. No. 4,184,373. Combinations of these multi-stage functionalized impact modifiers may be made with the non-stage acrylic copolymer compositions defined earlier in all ratios, which combinations will be useful in preparing the composites and blends herein claimed.

The blend may further contain impact modifiers known to the art, such as multistage polymers based on a poly(acrylate) first stage or a polybutadiene first stage and a methacrylate or styrene second stage, which may be present as a shell or in separate domains within the core. Either stage may contain acid-functional groups.

The blend may further contain plasticizers, such as glycerol or other polyhydroxy compounds in small amounts, such as up to 10 percent by weight of the blend.

EXAMPLES

The acrylic copolymers described hereto are prepared in emulsion by methods described in LaFleur et al., U.S. Pat. Nos. 5, 189,097 and 5,258,250, herein incorporated by reference. MMA is methyl methacrylate, NVP is N-vinylpyrrolidone, BA is n-butyl acrylate, and AA is acrylic acid. The acrylic copolymers described in the following examples are prepared by emulsion polymerization of commercially available monomers. The molecular weight of the copolymers is approximately 300,000 (weight-average, as measured by gel permeation chromatography versus a PMMA standard). The starches used in the examples are obtained from National Starch and Chemical Corporation. They are as follows: HYLON VII is an unmodified high amylose corn starch which contains approximately 70% amylose. AMIOCA is a food grade starch consisting primarily of amylopectin, a naturally occurring branched glucose polymer.

PREPARATIVE EXAMPLE A

This example teaches the general method for preparing copolymers of methyl methacrylate and methacrylic acid or terpolymers of methyl methacrylate, butyl acrylate and acrylic acid.

A copolymer comprising 15 weight percent methacrylic acid (MAA), and the remainder methyl methacrylate (MMA) is prepared by an emulsion polymerization technique as follows: A monomer mixture is prepared, which contained 1122 grams of MMA, 198 grams of MAA, 782.71 grams of deionized water, 1.32 grams of n-dodecyl mercaptan and 24.75 grams of a 10% aqueous sodium dodecylbenzene sulfonate solution. To an appropriate glass vessel equipped with stirrer, heater, a reflux condenser, and nitrogen sparge tube, is added 1753.26 grants of deionized water, and 0.59 grams of sodium carbonate. The mixture is sparged for one hour with nitrogen while heating to 70° C. The sparge rate is then changed to a sweep and 74.25 grams of a 10% aqueous solution of sodium dodecylbenzene sulfonate is added to the mixture. The temperature of the reaction vessel is then raised to 85° C. At this temperature, 29.343 grams of the initiator mixture, which consisted of 1.32 grams of sodium persulfate and 380.08 grams of deionized water, is added to the reaction vessel, along with 31.42 mL of rinse water. The monomer mixture is then fed into the reaction vessel over a three-hour period.

As the polymerization proceeds, the initiator mixture is added to the reaction vessel at the rate of 29.34 mL every 15 minutes. The accumulation of solids is measured every 30 minutes just before the addition of the initiator mixture. At the completion of the initiator and monomer addition, followed by a 31.42 mL water rinse of each feed line, the mixture is held at 85° C. for one hour. The mixture is then cooled, filtered and the polymer isolated by spray drying. The molecular weight of this polymer is about 300,000.

In a similar manner, other polymers of controlled molecular weight of alkyl (meth)acrylates and unsaturated acids may be prepared, such as a terpolymer of methyl methacrylate/butyl acrylate/acrylic acid=50/45/5. The method is also used to prepare tetrapolymers, such as a tetrapolymer of methyl methacrylate/ethyl acrylate/ N-vinylpyrrolidone/ methacrylic acid=55/18/25/2.

COMPARATIVE EXAMPLES 1 AND 2

The tensile properties of both HYLON VII and AMIOCA were determined indirectly for neat starch by George et al., Poly. Eng. Sci., 34, 17–23 (1994), who obtained tensile properties for the neat starch by extrapolation of data derived from melt processable mixtures of starch with glycerine and water. The values, listed in Table I, suggest that the poor extensibility of neat starch compromises the mechanical integrity of those articles of commerce in which starch forms the major component.

EXAMPLE 3

For EX. 3,790 g of corn starch, HYLON VII (70% amylose and 30% amylopectin) is treated with 433 g of an emulsion comprising of 46% solids, a pH of 3.63 and 504 nm particles of chemical composition: P(MMA-BA-AA= 50/45/05). 10 g of stearic acid and 5 g of a hindered phenol, tetrakis(methylene(3,5-di-t-butyl-4hydroxyhydrocinnamate)methane, are added to the starch emulsion mixture. The entire mixture is digested in 1500 mls. of boiling distilled water and vigorously agitated until the starch mixture coagulated. The coagulated mixture is freed of water in a vacuum oven at about 50° C. to yield a free flowing powder. The powder mixture is melt compounded and kneaded on a two-roll electric mill for ca. three minutes at 174° C. front roll and 172° C. rear roll. The molten polymer is then removed from the mill rolls, cooled and compression molded on a Carver press. The samples are molded at 138 megapascals (mPa) and 195° C. into 127 mm square by 0.13 mm thick plaques. The plaques are machined into tensile and Izod bars for evaluation according to ASTM test methods, D638-84 and D256-84.

EXAMPLE 4

Example 3 is repeated with 790 g of HYLON VII and 472 g of (P(MMA-NVP-EA-MAA=55/25/18/02)) emulsion. The emulsion contained 42.35 weight percent of solid particles of average diameter 160 nm. Stearic acid (10 g) and 5 g of the hindered phenol of Example 3 are added to the starch/emulsion mixture. The entire mixture is coagulated in 1500 mls of distilled water with vigorous agitation. The coagulated mixture is freed of water in a vacuum oven at about 50° C. to yield a free flowing powder. The powder mixture is melt compounded and kneaded on a two-roll electric mill for ca. three minutes at 174° C. front roll and 172° C. rear roll. The molten polymer is then removed from the mill rolls, cooled and compression molded on a Carver press. The samples are molded at 138 megapascals (mPa) and 195° C. into 127 mm square by 0.13 mm thick plaques. The plaques are machined into tensile and Izod bars for evaluation according to ASTM test methods, D638-84 and D256-84.

EXAMPLE 5

For EX. 5,790 g of corn starch, AMIOCA (mainly amylopectin) is treated with 433 g of an emulsion comprising of 46% solids, pH of 3.63 and 504 nm particles. The chemical composition of the polymer is: P(MMA/BA/AA=50/45/05). In addition, 10 g of stearic acid and 5 g of the hindered phenol of Example 3 are added to the starch emulsion mixture. The entire mixture is digested in 1500 mls. of boiling distilled water and vigorously agitated until the starch/acrylic polymer mixture is uniform in appearance. The mixture is freed of water in a vacuum oven at about 50° C. yielding a hard monolithic mass. The monolith is fractured and the large pieces are granulated to yield a free flowing powder. The powder mixture is melt compounded and kneaded on a two-roll electric mill for ca. three minutes at 174° C. front roll and 172° C. rear roll. The molten polymer is then removed from the mill rolls, cooled and compression molded on a Carver press. The samples are molded at 138 megapascals (mPa) and 195° C. into 127 mm square by 0.13 mm thick plaques. The plaques are machined into tensile and Izod bars for evaluation according to ASTM test methods, D638-84 and D256-84.

EXAMPLE 6

Example 5 is repeated with 790 g of AMIOCA and 472 g of (P(MMA-NVP-EA-MAA=55/25/18/02)) emulsion. The emulsion contained 42.35 weight percent of solid particles of average diameter 160 nm. 10 g stearic acid and 5 g of the hindered phenol of Example 3 are added to the starch emulsion mixture. The entire mixture is blended in 1500 mls of distilled water with vigorous agitation. The uniform mixture is freed of water in a vacuum oven at about 50° C. and granulated to yield a free flowing powder. The powder mixture is melt compounded and kneaded on a two-roll electric mill for ca. three minutes at 174° C. front roll and 172° C. rear roll. The molten polymer is then removed from the mill rolls, cooled and compression molded on a Carver press. The samples are molded at 138 megapascals (mPa) and 195° C. into 127 mm square by 0.13 mm thick plaques. The plaques are machined into tensile and Izod bars for evaluation according to ASTM test methods, D638-84 and D256-84.

From the data listed in TABLE I, it can be seen that the mechanical properties of the alloys compare favorably with that of the base polymers, HYLON VII and AMIOCA. The tensile properties of the neat starch are determined by extrapolation of data obtained from blends of neat starch with glycerine and deionized water. As can be seen from Table I, the plasticized starch compounds, Ex. 1 and 2, are too brittle for those applications which require some degree of toughness. The obvious benefit derived from combining either HYLON VII or AMIOCA with the acrylic copolymers is that unlike the glycerine/water mixture, the high polymeric acrylic copolymers not only confer melt processability to the starch alloys, but also ensure stability with respect to plasticizer migration and concomitant embrittlement.

TABLE I

Mechanical Properties of Corn Starch and Alloys of Corn Starch and Acrylic Copolymers.

| POLYMER/ | COMPOSITION % (w/w) | | | | | |
|---|---|---|---|---|---|---|
| EXAMPLES | 1 | 2 | 3 | 4 | 5 | 6 |
| HYLON VII | 100 | | 80 | 80 | | |
| AMIOCA | | 100 | | | 80 | 80 |
| P(MMA-BA-AA = 50/45/05) | | | 20 | | 20 | |
| P (MMA-NVP-EA-MAA = 55/25/18/02) | | | | 20 | | 20 |
| Tensile Strength (mPa) | 41.3 | 33.6 | 20.5 | 40.2 | 22.7 | 31.2 |
| Tensile Elongation (%) | 0.0. | 0.0 | 4.5 | 0.9 | 3.3 | 0.7 |
| Tensile Modulus (gPa) | 2.9 | 2.3 | 1.9. | 4.5. | 2.0 | 4.5 |
| Izod Unnotched Impact (J/m) | — | — | 57.1 | 29.9 | 33.6 | 29.9 |

EXAMPLE 7

This example describes dry-blending of starch and the acrylic additive. A tetrapolymer of methyl methacrylate/N-vinylpyrrolidone/ethyl acrylate/methacrylic acid=55/25/18/02, prepared by the method described in Example A, is isolated from emulsion by spray-drying as a fine powder. Ten parts of this powder is introduced into the mixing bowl of a HBI System 90 Microprocessor-controlled Torque Rheometer. The powder was stirred at a set temperature of 204° C. and a screw speed of 80 rpm until it had fused into a molten mass. Then HYLON VII (70% amylose, 30% amylopectin) (90 parts), 1 part of stearic acid and 0.5 parts of the hindered phenol antioxidant of Example 1 are added to the mixing bowl and the mixture is melt compounded into a thermally stable homogeneous cream-colored plastic mass. No evidence of degradation is noted after a residence time of five minutes in the mixing bowl.

EXAMPLE 8

In a manner similar to Example 7, a tetrapolymer of methyl methacrylate/poly(ethylene glycol) monomethacrylate (the poly(ethylene glycol) of MW=400) /ethyl acrylate/ methacrylic acid=70/10/18/02 of MW ca. 300,000 is prepared by the method of Example A and spray-dried. Here the acrylic polymer is pre-fused at 200° C. The final homogeneous mass is thermally stable for 10 minutes in the mixing bowl.

EXAMPLE 9

In this and the following example, amylopectin is the form of starch used. In a manner similar to Example 7, but with the substitution of AMIOCA for HYLON VII, similar results were achieved.

EXAMPLE 10

In a manner similar to Example 8, but with the substitution of AMIOCA for HYLON VII, similar results were achieved.

We claim:

1. A melt-processed polymeric blend consisting essentially of from about 70 to about 95 parts of starch and 5 to 30 parts of a second, multi-stage polymer comprising:
   a. from 60 to 85 parts of a rubbery cross-linked core polymer which contains greater than 75 weight percent, based on total weight of the core, of butadiene and/or one or more $C_2$–$C_8$ alkyl esters of acrylic acid, and from 0 to 5 weight percent of a copolymerized unsaturated acid;
   b. from 15 to 40 parts of a second-staged polymer containing at least about 70 parts of units derived from at least one of an alkyl, cycloalkyl, hydroxyalkyl(polyalkoxy)alkyl, or alkyloxy(polyalkoxy)alkyl ester of acrylic or methacrylic acid, and at least one of either up to 25 parts of units derived from a vinyl or vinylidene monomer containing an amide group or up to 25 parts of units derived from an unsaturated carboxylic acid or anhydride.

2. A melt-processed polymeric blend consisting essentially of from about 70 to about 95 parts of starch and a mixture totaling 5 to 30 parts of:
   a. a second polymer containing at least about 70 parts of units derived from at least one of an alkyl, cycloalkyl, hydroxyalkyl(polyalkoxy)alkyl, or alkyloxy(polyalkoxy)alkyl ester of acrylic or methacrylic acid, and at least one of either up to 25 parts of units derived from a vinyl or vinylidene monomer containing an amide group or up to 25 parts of units derived from an unsaturated carboxylic acid or anhydride, wherein the second polymer has a weight-average molecular weight of at least of at least 80,000;
   b. a third, multi-stage polymer comprising:
      (i) from 60 to 85 parts of a rubbery cross-linked core polymer which contains greater than 75 weight percent, based on total weight of the core, of butadiene and/or one or more $C_2$–$C_8$ alkyl esters of acrylic acid, and from 0 to 5 weight percent of a copolymerized unsaturated acid;
      (ii) from 15 to 40 parts of a second-staged polymer containing at least about 70 parts of units derived from at least one of an alkyl, cycloalkyl, hydroxyalkyl(polyalkoxy)alkyl, or alkyloxy(polyalkoxy)alkyl ester of acrylic or methacrylic acid, and at least one of either up to 25 parts of units derived from a vinyl or vinylidene monomer containing an amide group or up to 25 parts of units derived from an unsaturated carboxylic acid or anhydride.

* * * * *